(No Model.)
G. D. TOLMAN.
SCREW BOLT LOCK.
No. 322,657. Patented July 21, 1885.
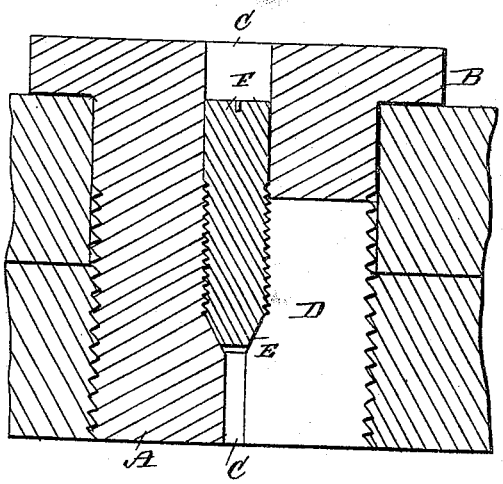
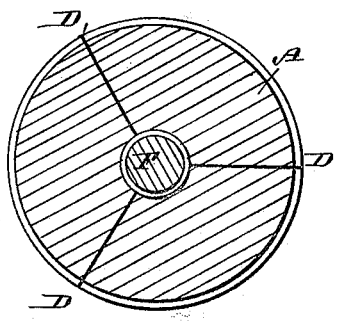
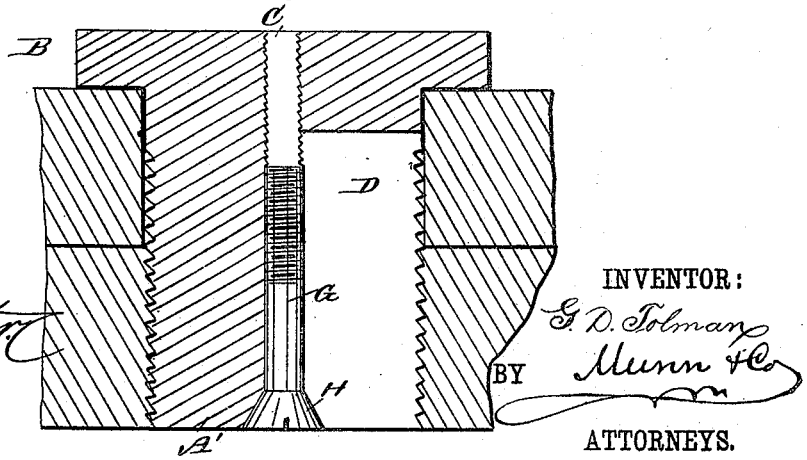
WITNESSES:
Theo. G. Hoster
C. Sedgwick
INVENTOR:
G. D. Tolman
BY Munn & Co.
ATTORNEYS.

UNITED STATES PATENT OFFICE.

GAYGER D. TOLMAN, OF SHAWANO, WISCONSIN.

SCREW-BOLT LOCK.

SPECIFICATION forming part of Letters Patent No. 322,657, dated July 21, 1885.

Application filed February 2, 1885. (No model.)

*To all whom it may concern:*

Be it known that I, GAYGER D. TOLMAN, of Shawano, Shawano county, Wisconsin, have invented a new and Improved Screw-Bolt Lock, of which the following is a full, clear, and exact description.

The object of my invention is to provide a new and improved device for locking screw-bolts and preventing them from turning.

The invention relates to improvements in that class of nut-locks in which the end of a bolt is expanded by screwing a screw or bolt into a screw-threaded aperture of the same, the said bolt being slitted to facilitate the expansion; and the invention consists in the peculiar construction and arrangement of parts, all as hereinafter fully described, and pointed out in the claim.

Reference is to be had to the accompanying drawings, forming part of this specification, in which similar letters of reference indicate corresponding parts in all the figures.

Figures 1 and 3 are cross-sections of screw-bolts provided with different constructions of my improved screw-bolt lock. Fig. 2 is a horizontal sectional view of Fig. 1.

The screw-bolt A is provided on its outer end with an annular flange, B, and with a longitudinal central aperture, C, which is screw-threaded throughout its entire length or part of the same. From the said aperture one or more slots, D, extend to the outer surface of the screw-bolt, and extend from the bottom up to about one-third of the length of the bolt from the top or head.

In Fig. 1 the lower end of the aperture C is constructed with an inclined shoulder, E, between the wide and narrow parts of the aperture. A screw, F, having its lower end tapered and made conical to fit against the bevel E, is screwed into the aperture C and spreads the lower split end of the screw-bolt A, thus locking the same on the article into which it has been screwed.

In Fig. 3 the aperture C has uniform width from top to bottom, and at the lower end of the aperture a tapered countersink is formed in the lower end of the bolt. A screw, G, having an inverted conical head, H, is screwed into the aperture C from the bottom, the head H entering the conical countersink, and by acting on the sides of the same spreads the lower end of the bolt and thus locks it in place. By my construction the spreading action is caused by a different part of the screw from that which is screw-threaded, thereby relieving the screw-threads of strain and preventing injury to the same. I am aware that the end of a screw-bolt has been expanded by a conical plug on the end of a bolt; but in this case the bolt is screwed into a nut projecting from the end of the screw-bolt, and the conical plug enters a plain recess in the screw-bolt, and would injure the screw-threads on both the nut and the screw-bolt.

Having thus described my invention, I claim as new and desire to secure by Letters Patent—

A screw-bolt having a longitudinal screw-threaded aperture, having its lower end provided with a smooth inclined shoulder, in combination with a screw having a portion of it smooth and tapered to correspond with the inclined portion of the aperture, substantially as herein shown and described.

GAYGER D. TOLMAN.

Witnesses:
L. D. ROBERTS,
W. W. HOLLISTER.